United States Patent [19]

Bournazel et al.

[11] Patent Number: 4,867,205
[45] Date of Patent: Sep. 19, 1989

[54] FLEXIBLE DUCT HAVING NO APPRECIABLE VARIATION IN LENGTH UNDER THE EFFECT OF AN INTERNAL PRESSURE

[75] Inventors: Claude Bournazel, Dampierre; Jany Feret, Marly Le Roi, both of France

[73] Assignee: Institut Francais du Petrole, Rueil-Malmaison, France

[21] Appl. No.: 923,418

[22] Filed: Oct. 27, 1986

Related U.S. Application Data

[63] Continuation of Ser. No. 684,296, Dec. 20, 1984, abandoned.

[30] Foreign Application Priority Data

Dec. 22, 1983 [FR] France .................................. 83 20754

[51] Int. Cl.$^4$ ......................... F16L 11/14; F16L 11/16
[52] U.S. Cl. ................................................... 138/130
[58] Field of Search .......................................... 138/130

[56] References Cited

FOREIGN PATENT DOCUMENTS 8600051  4/1987  Hungary .............................. 138/130

Primary Examiner—Henry J. Recla
Assistant Examiner—Glenn T. Barrett
Attorney, Agent, or Firm—Antonelli, Terry & Wands

[57] ABSTRACT

A reinforced flexible duct, particularly for transporting pressurized fluids having an internal pressure reinforcement and a traction resisting reinforcement. The internal pressure reinforcement is wound at a high angle with respect to the axis of the duct and the traction resisting reinforcement comprises at least one pair of crossed layers wound at an angle at most equal to 55°. The modulus of elasticity of the material for the internal pressure resisting reinforcement is smaller than the modulus of elasticity of the material for the traction resisting reinforcement.

3 Claims, 1 Drawing Sheet

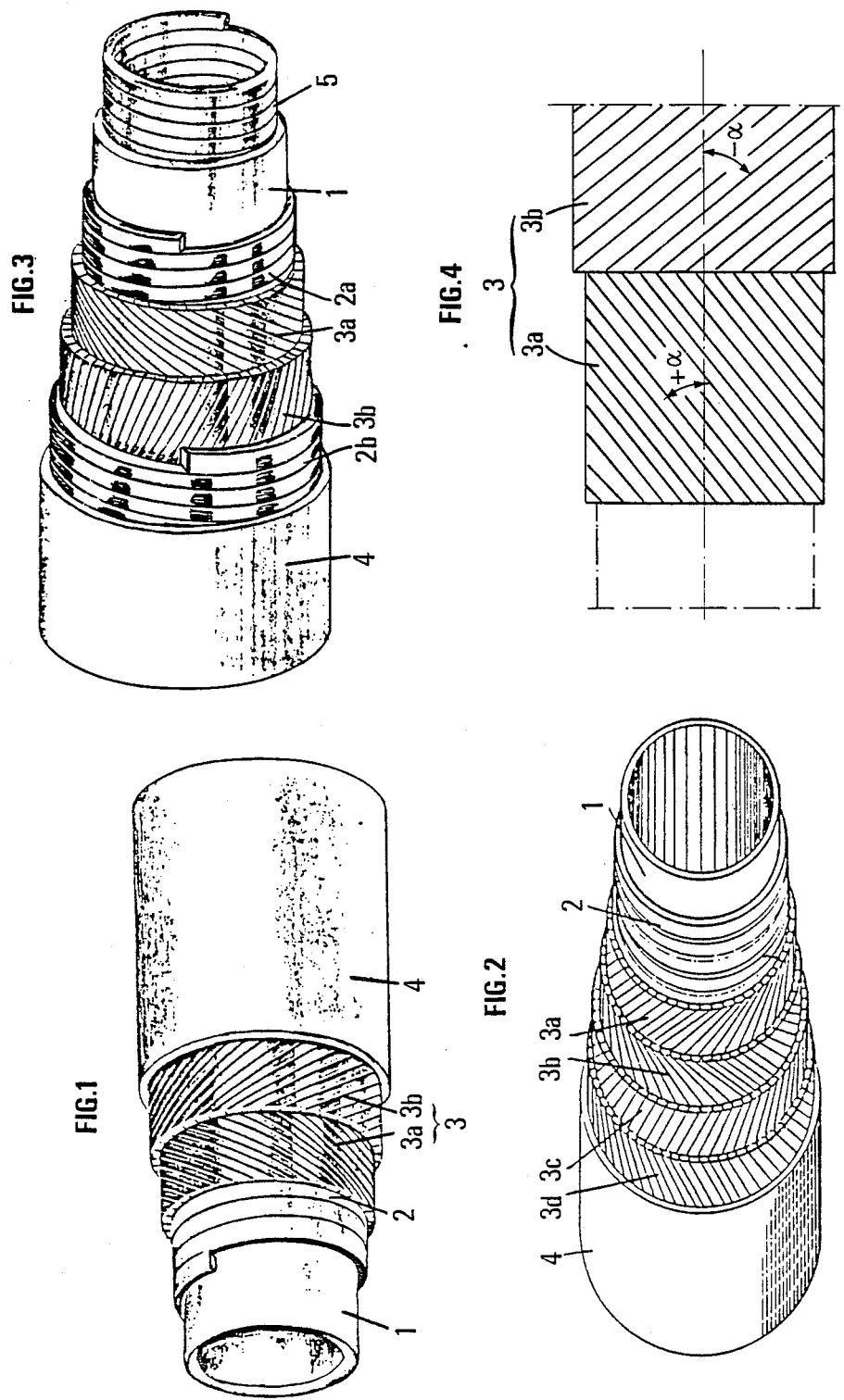

FLEXIBLE DUCT HAVING NO APPRECIABLE VARIATION IN LENGTH UNDER THE EFFECT OF AN INTERNAL PRESSURE

This is a continuation of application Ser. No. 684,296, filed Dec. 20, 1984.

BACKGROUND OF THE INVENTION

The present invention relates to a novel flexible duct structure without appreciable variation in length under the effect of an internal pressure.

The invention applies more particularly to constructing flexible ducts for transporting pressurized fluids, such as water or hydrocarbons.

For numerous applications of such ducts, it is often desireable, and sometimes necessary, to have available flexible ducts which show no appreciable variation in length when they are subjected to an internal pressure with "bottom effect", namely, the application of an axial force resulting from the action of the internal pressure at the ends of the flexible ducts.

In fact, extension of the flexible duct in the service, under the effect of the internal pressure, risks being a serious drawback in numerous applications.

This is a case more especially for sub-sea collecting ducts which must be embedded, i.e., disposed at the bottom of a trench, so as to avoid risks of damage due to shipping.

If the duct thus disposed tends to grow longer when it is pressurized, it risks being deformed vertically and to reappear out of the trench, which obviously cancels out the embedding effect.

In, for example, French Patents 1,417,966 and 2,177,966, structures of "multi-layer" reinforced flexible ducts are proposed to which the improvement of the invention applies, with the flexible ducts mainly comprising a pressure resisting reinforcement comprising one or more layers of rings or wires, cables or extruded sections wound at a high angle with respect to the axis of the flexible duct, which angle might possibly exceed 85°. A traction resistant reinforcement is provided which comprises one or more pairs of crossed layers of wires, cables or extruded sections wound in an angle of at most 55°; however, the angle is not to be too small so as to maintain the flexibility of the duct.

These above noted different layers may be disposed in any order from the inside to the outside of the flexible duct structure and be separated or not by plastic sheaths of small thickness.

U.S. Pat. No. 2,727,616 proposes adopting an angle greater than 55° for winding the helically disposed fibers so as to overcome the problem of increasing the bending stiffness, but this patent relates to the construction of a rigid pipe and not a flexible tube.

The stiffness K of a reinforcement, proportional to the modulus of elasticity E of the material forming the layers thereof and to the amount of this material is defined by the product $$K = E.e$$

where e, representing a total useful thickness, is, in fact, the total thickness of the layers of the reinforcement when these layers are formed from solid rectangular and jointing wires. When it is a question of hollow or round wires or extruded sections, the useful thickness is deduced from the total thickness $e_g$ taking into account the empty spaces or clearances formed inside the wires or therebetween, the relationship is:

$$e = b.e_g$$

where b represents the ratio of the volume of reinforcing material forming the reinforcement to the total volume occupied thereby.

The index P is attributed to the reinforcement withstanding the internal pressure and t to the reinforcement withstanding the traction.

Thus, $$K_p = E_p.e_p \text{ and } K_t = E_t.e_t.$$

In flexible ducts of the prior art, in which it is desired above all to distribute the stresses in the different reinforcement layers so as to reduce the total thickness and so the weight and price of the flexible duct, the ratio $K_t/K_p$ is small (less than unity).

But this type of structure cannot lead to flexible ducts which are stable in length under the effect of the internal pressure. In the present state of technique, in order to reduce the extension as much as possible, the traction resisting reinforcement is wound at a very small angle (<20°) which causes greater manufacturing difficulties but does not reduce this extension sufficiently for numerous applications, particularly in sub-sea collecting ducts which may be embedded.

To avoid variations in length under the effect of internal pressure, in accordance with advantageous features of the present invention, a flexible structure of the above-mentioned type is provided but the ratio of stiffness $K_t/K_p$ is between 2.5 and 8 for a winding angle of the traction reinforcements $\alpha$ between 20° and 50°.

It has been determined that a better result is obtained when the ratio of stiffness and the angle $\alpha$ are linked by the following relationships:

$$0.75 < \frac{K_t}{K_p}(0.056\alpha - 0.0008\alpha^2 - 0.65) < 1.25,$$

where $\alpha$, expressed in degrees is between 20 and 50.

In order to reduce the influence of an error on the winding angle, that is to say increasing the acceptable tolerance concerning this manufacturing parameter, a structure will be preferred such that the following relationship exists $$0.90 < \frac{K_t}{K_p}(0.056\alpha - 0.0008\alpha^2 - 0.65) < 1.10,$$

where $\alpha$ in degrees is limited between 25 and 45.

Thus, by forming a flexible duct such that the ratio of the reinforcement stiffnesses $K_t/K_p = 3$, where the traction layers are wound at 35°, a variation in length under pressure is obtained which is at least ten times less than would be the case at present with conventional structures, while allowing a tolerance of 10% in the ratio of the stiffnesses and from 2° to 3° in the winding angle.

BRIEF DESCRIPTION OF THE DRAWINGS

The accompanying figures show reinforced flexible ducts to which the invention applies:

FIG. 1 illustrates a first type of reinforced flexible duct,

FIGS. 2 and 3 show other types of ducts, and

FIG. 4 is a diagram showing the winding angle for the reinforcement layers withstanding the traction.

DETAILED DESCRIPTION OF THE PREFERRED EMBODIMENT

Referring now to the drawings wherein like reference numerals are used throughout the various views to designate like parts and, more particularly, to FIG. 1, according to this Figure an internal duct 1 is formed, for example, from a plastic material such as, for example, nylon.

The duct is covered with a pressure resisting reinforcement 2 which, in the example shown, is formed by winding strip metal or a preformed extruded section, wound helically at an angle for example exceeding 85° with respect to the axis of the duct.

The assembly is covered with a traction resisting reinforcement 3 formed from two crossed layers 3a, 3b of helically wound extruded sections with opposite pitches in the two layers. The absolute value of the winding angle $\alpha$ for these extruded sections has a value between 20° and 50° with respect to the axis of the duct. An external sheath $-4$ of, for example, nylon covers the assembly thus formed.

In the flexible duct of FIG. 2, the traction resisting reinforcement comprises two pairs of crossed layers 3a, 3b and 3c, 3d of extruded sections wound in a helix at an angle between 20° and 50° with respect to the axis of the duct.

In FIG. 3, a steel carcass 5 is disposed inside the plastic material duct 1 and layers 2a, 2b of the internal pressure resisting reinforcement are disposed on each side of the traction resisting reinforcement 3a, 3b.

In the embodiment of FIG. 3, the carcass 5 is not taken into account for calculating the stiffness $K_p$ of the internal pressure resisting reinforcement if this carcass is not sealed and, consequently, is not subjected to a differential pressure when a pressurized fluid flows in the duct (so does not contribute to the resistance of the duct to the internal pressure). In the structure of the invention, a better distribution of stresses is obtained and so a reduction of the total thickness if a material is chosen for forming the pressure resisting reinforcement whose modulus of elasticity $E_p$ is (i.e. definitely) smaller than $E_t$.

Thus, if the traction resisting reinforcement layers are made from steel ($E_t \simeq 200$ GPa), the pressure resisting reinforcement may, for example, be formed with a composite material (resin reinforced with glass fibers or other filaments), this material having a lower modulus of elasticity (E from 30 to 60 GPa). Such a material has the further advantage of resisting high forces while having a low density. Thus, a flexible duct is obtained which is not only lighter but which is stable under the effect of the internal pressure. The internal pressure resisting reinforcement may also be formed from an aluminium alloy, from titanium, or from any other material having a low modulus of elasticity.

What is claomed is:

1. A reinforced flexible duct substantially invariable in axial length due to effects of changes of internal pressure in the flexible duct, the flexible duct comprising an internal pressure resisting reinforcement having at least one layer formed from rings, or wires, cables or extruded sections which would be at a high angle with respect to an axis of the duct and a traction resisting reinforcement comprising at least one pair of crossed layers or wires, cables or extruded sections wound at an angle of at most equal to 55° with respect to the axis of the duct, wherein a ratio $K_t/K_p$ of the stiffness of traction resisting reinforcement to the stiffness of the internal pressure resisting reinforcement is between 2.5 and 8 and the winding angle $\alpha$ of said pair of crossed layers or wires, cables or extruded sections constituting the traction resisting reinforcement has a value of between 20° and 50° with respect to the axis of the flexible duct, the stiffness K of each reinforcement being defined by a product of:

$K = E \cdot e$, where:

E is the modulus of elasticity of the material forming the reinforcement considered, and e is the total useful thickness of the reinforcement, said ratio $K_t/K_p$ of the stiffness and the angle $\alpha$ satisfy the relationship:

$0.75 < K_t (0.056\alpha - 0.0008\alpha^2 - 0.65) < 1.25$, and wherein the internal pressure resisting reinforcement is made from a material having a modulus of elasticity $E_p$ smaller than the modulus of elasticity $E_t$ of the material forming the traction resisting reinforcement.

2. The flexible duct as claimed in claim 1, wherein said ratio $K_t/K_p$ of the stiffnesses and the angle $\alpha$ satisfy the relationships:

$0.90 < K_t/K_p \ (0.056\alpha - 0.0008\alpha^2 - 0.65) < 1.10$ the value of $\alpha$, expressed in degrees, being between 25 and 45.

3. The flexible duct as claimed in claim 1, wherein the pressure resisting reinforcement is made from reinforced resin and the traction resistant reinforcement is made from steel.

* * * * *